United States Patent
Kecht (10) Patent No.: US 11,148,457 B2
(45) Date of Patent: Oct. 19, 2021

(54) VALUE DOCUMENT HAVING SECURITY MARKING WITH VARYING DECAY TIME AND METHOD FOR IDENTIFYING THE SECURITY MARKING

(71) Applicant: GIESECKE+DEVRIENT CURRENCY TECHNOLOGY GMBH, Munich (DE)

(72) Inventor: Johann Kecht, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 52 days.

(21) Appl. No.: 16/606,026

(22) PCT Filed: Apr. 17, 2018

(86) PCT No.: PCT/EP2018/000207
§ 371 (c)(1),
(2) Date: Oct. 17, 2019

(87) PCT Pub. No.: WO2018/192679
PCT Pub. Date: Oct. 25, 2018

(65) Prior Publication Data
US 2021/0070093 A1    Mar. 11, 2021

(30) Foreign Application Priority Data
Apr. 18, 2017   (DE) .................... 10 2017 003 746.9

(51) Int. Cl.
*B42D 25/382*   (2014.01)
*B42D 25/24*   (2014.01)
(Continued)

(52) U.S. Cl.
CPC .......... *B42D 25/382* (2014.10); *B42D 25/24* (2014.10); *B42D 25/29* (2014.10);
(Continued)

(58) Field of Classification Search
CPC ...... B42D 25/382; B42D 25/24; B42D 25/29; C09K 11/7795; C09K 11/77;
(Continued)

(56) References Cited

U.S. PATENT DOCUMENTS 6,841,092 B2   1/2005   Paeschke et al.
7,762,468 B2   7/2010   Jones et al.
(Continued)

FOREIGN PATENT DOCUMENTS

DE   2745301 C2    3/1983
DE   10346687 A1   5/2005
(Continued)

OTHER PUBLICATIONS

German Search Report from DE Application No. 102017003746.9, dated Nov. 21, 2017.
(Continued)

*Primary Examiner* — Justin V Lewis
(74) *Attorney, Agent, or Firm* — Workman Nydegger (57) ABSTRACT

A value document has a security marking in the form of two luminescent substances whose the emission spectra partially overlap in a primary emission range. The emission spectra have a degree of overlap of less than 80% and more than 5%, wherein the luminescent substances have different individual decay times in the primary emission range. The individual decay times of the luminescent substances differ from each other by more than 50% with reference to the shortest individual decay time.

21 Claims, 5 Drawing Sheets

(51) Int. Cl.
 *B42D 25/29* (2014.01)
 *G07D 7/1205* (2016.01)
 *C09K 11/77* (2006.01)
 *G07D 7/202* (2016.01)

(52) U.S. Cl.
 CPC ...... *C09K 11/7708* (2013.01); *C09K 11/7709* (2013.01); *C09K 11/7795* (2013.01); *G07D 7/1205* (2017.05); *G07D 7/205* (2013.01)

(58) Field of Classification Search
 CPC ............ C09K 11/7709; C09K 11/7708; G07D 7/1205; G07D 7/205; G07D 7/202
 USPC .............. 283/67, 70, 72, 74, 91, 94, 98, 901
 See application file for complete search history.

(56) References Cited

U.S. PATENT DOCUMENTS

| | | |
|---|---|---|
| 7,800,088 B2 | 9/2010 | Ross et al. |
| 7,927,511 B2 | 4/2011 | Giering et al. |
| 9,046,486 B2 | 6/2015 | Carr et al. |
| 9,409,434 B2 | 8/2016 | Kecht et al. |
| 9,878,573 B2 | 1/2018 | Giering et al. |
| 9,987,874 B2 | 6/2018 | Giering et al. |
| 9,989,411 B2 | 6/2018 | Deckenbach et al. |
| 10,013,835 B2 | 7/2018 | Kecht et al. |
| 10,445,968 B2 | 10/2019 | Berthe et al. |
| 2002/0130304 A1 | 9/2002 | Paeschke et al. |
| 2005/0067489 A1 | 3/2005 | Jones et al. |
| 2006/0118741 A1 | 6/2006 | Ross et al. |
| 2007/0202352 A1 | 8/2007 | Giering et al. |
| 2008/0252065 A1 | 10/2008 | Giering et al. |
| 2012/0256409 A1 | 10/2012 | Giering et al. |
| 2013/0015651 A1 | 1/2013 | Lau et al. |
| 2013/0106090 A1 | 5/2013 | Kecht et al. |
| 2014/0001351 A1* | 1/2014 | Carr .................. G01N 21/6408 250/271 |
| 2014/0021369 A1 | 1/2014 | Rapoport et al. |
| 2015/0191038 A1 | 7/2015 | Giering et al. |
| 2015/0348351 A1 | 12/2015 | Deckenbach et al. |
| 2017/0076530 A1 | 3/2017 | Kecht et al. |
| 2018/0122173 A1 | 5/2018 | Berthe et al. |

FOREIGN PATENT DOCUMENTS

| | | |
|---|---|---|
| DE | 102014016858 A1 | 8/2015 |
| EP | 1241242 A2 | 9/2002 |
| EP | 2570468 A1 | 3/2013 |
| FR | 3035253 A1 | 10/2016 |
| WO | 2005036479 A2 | 4/2005 |
| WO | 2011002960 A1 | 1/2011 |
| WO | 2011082794 A1 | 7/2011 |
| WO | 2011106522 A1 | 9/2011 |
| WO | 2012003854 A1 | 1/2012 |
| WO | 2013033009 A1 | 3/2013 |
| WO | 2014095055 A1 | 6/2014 |

OTHER PUBLICATIONS

International Search Report & Written Opinion from PCT Application No. PCT/EP2018/000207, dated Jun. 21, 2018.
Indian Examination Report from corresponding Application No. 201937033928, dated Mar. 19, 2021.

* cited by examiner

VALUE DOCUMENT HAVING SECURITY MARKING WITH VARYING DECAY TIME AND METHOD FOR IDENTIFYING THE SECURITY MARKING

BACKGROUND

The present invention lies in the technical field of the manufacture and verification of value documents and relates to a value document having a security marking with a spectrally continuously varying decay time, as well as a method for identifying the same.

Value documents are understood here as sheet-shaped objects, which represent, for example, a monetary value or an authorization and which should therefore not be manufacturable at will by unauthorized persons. Hence, they have features that are not easily manufactured, in particular copied, whose presence is an indication of authenticity, i.e. of manufacture by an authorized body. Some important examples of such value documents are chip cards, coupons, vouchers, checks and in particular banknotes.

Value documents are usually protected by a special mark against unwanted and possibly unlawful duplication. It has long been known to equip value documents for this purpose with luminescent substances which have a specific emission behavior. In particular, the employment of security features from a combination of different luminescent substances and the determination and evaluation of the luminescence decay time for checking value documents is known.

With the luminescent substances and evaluation methods known in the state of the art a satisfactory forgery-proof identification marking of value documents can be achieved, however in the case of security features with a combination of luminescent substances whose emissions do not overlap spectrally, the spectral properties of the individual luminescent substances can be analyzed separately, so that no particularly high protection against analysis and imitation of the security feature is achieved. By employing luminescent substances whose emissions partially or completely overlap, an analysis is already rendered markedly more difficult, but also here there is the possibility to produce an emission spectrum that is similar in sum through a combination of luminescent substances with different spectral properties, for example other emission band positions. In addition, according to the state of the art, in practice it is necessary for the luminescent substances to have an identical emission wavelength or at least only slightly different emission wavelengths, since the emissions of the luminescent substances must act in sum like the emission of one single luminescent substance. However, this involves a significant limitation with respect to the choice of luminescent substances, since luminescent substances with markedly different emissions and emissions with little overlap which can be separated into different spectral ranges cannot be used and evaluated. The limitation of the available combinatorial diversity and the associated limited variability of the mark can result in a reduction of the forgery resistance.

If the luminescence decay time of a substance mixture according to the state of the art is to be evaluated, the choice of substance is further limited, since the individual decay times must be in a suitable relation to each other. In addition, an exact and unambiguous analysis of multi-exponential decay curves is technically very elaborate, which is disadvantageous in time-critical situations, such as on banknote processing machines running at high speed, or in the case of production fluctuations, in order to reliably assess such security features.

For example, the document U.S. Pat. No. 7,762,468 B2 shows an authentication method employing a combination of two luminescent substances with different decay times. Here, a slowly decaying luminescent substance is detected only when the luminescence of a faster decaying luminescent substance has already subsided. The document US 2006118741 A1 also describes a security marking with a combination of two luminescent substances whose intensities are verified individually.

The document U.S. Pat. No. 9,046,486 B2 discloses a security marking based on a combination of luminescent substances with a different decay behavior, which in sum produce an emission with multi-exponential decay behavior. With the aid of a suitable adaptation both the amplitudes and the decay times of the decay curves are determined.

SUMMARY

The document WO 2011106522 A1 describes a security marking with a combination of two organic luminescent substances with overlapping emission spectra and different decay times. A disadvantage of employing organic dye molecules is, inter alia, their relatively low resistance to chemical and physical influences. In addition, they have emissions in the visible spectral range that are recognizable with the eye.

In contrast, the object of the present invention is to make possible a reliable identification marking of a value document with luminescent substances with partially overlapping emissions, which allows an increased forgery resistance by coupling the feature properties to the measuring method. In addition, the employment of a multiplicity of different luminescent substances should be possible and the identification of the security feature should be effected in a simple and fast manner.

According to the invention, a value document with a security marking (identification marking) is shown. Within the scope of the present invention, the term "value document" is to be understood as any objects to be protected against unwanted or unlawful duplication, for example banknotes, checks, shares, tokens, identity cards, credit cards and passports as well as labels, seals, packaging or other objects for securing value. The security marking of the value document according to the invention can be assigned to at least one (electively) definable property of the value document, wherein the property is given in the case of identification (i.e. presence) of the security marking and is not given in the case of non-identification (i.e. absence) of the security marking. For example, the security marking can be assigned to the property "authenticity" as an authenticity marking or authenticity feature, in order to recognize value documents as either authentic or fake. A further property would be, for example, the assignment of value documents on the basis of the security marking to a particular class or group, such as a banknote value or country of manufacture of banknotes.

According to the invention, the security marking of the value document is formed in the form of a combination of at least two luminescent substances. In the security marking, the at least two luminescent substances are contained in a definable or defined quantitative ratio in combination (preferably in the form of a mixture). This means that each luminescent substance is present in the security marking in a definable or defined relative quantitative proportion with reference to the overall quantity of luminescent substances. The security marking can thus be unambiguously identified.

The luminescent substances can be incorporated into or applied to the value document in various ways. For example, they can be admixed to a paper stock or plastic mass for manufacturing the value document or to a printing ink for printing the value document. It is also conceivable to provide the luminescent substances as a, for example invisible, coating on the value document. The luminescent substances can also be provided on or in a carrier material, for example composed of plastic, which is embedded in a paper stock or plastic mass for manufacturing the value document. The carrier material can be formed, for example, in the form of a security thread or identification thread, a mottling fiber or planchet. The carrier material can also be applied to the value document, for example in the form of a sticker, for example to carry out a product securing measure. In principle, any desired shaping of the carrier material is possible.

The luminescent substances of the security marking of the value document according to the invention have individual emission spectra which complement each other in a wavelength range (hereinafter referred to as overlap range). The two emission spectra overlap partially, but not completely. Depending on its relative quantitative proportion, each luminescent substance contributes with the intensity of its emitted luminescence radiation to the overall intensity of the security marking in the overlap range. The term "overall intensity" here and below refers to a summary intensity of the luminescence radiations of the luminescent substances contained in combination in the security marking, said luminescence radiations being excited by an (a same) excitation pulse and being detected at a same point in time at a particular wavelength or in a particular wavelength range. Correspondingly, the term "overall decay time" refers to the decay time of the overall intensity, as opposed to an individual decay time of the individual intensity of a luminescent substance.

The terms "integrated overall intensity" and "integrated individual intensity" refer to the spectral integral of the respective intensity over a specified range.

Figure 2A:
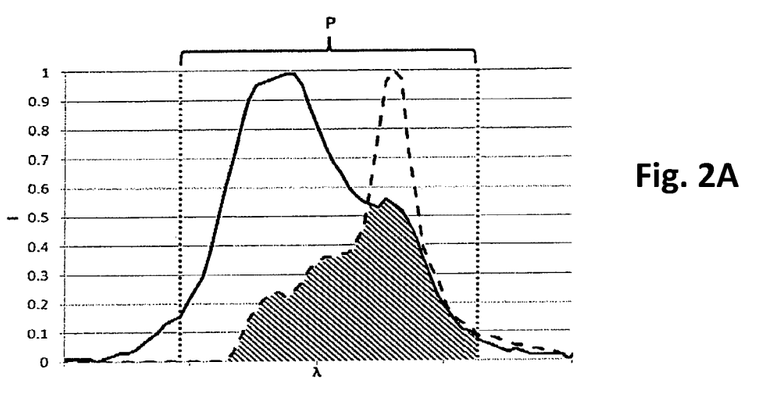
FIGS. 2A-2C diagram illustrating the overlap of two emission spectra (2A), the resulting overall intensity (2B), and the effective rise time (2C) and the definition of the primary emission range.
Figure 2B:
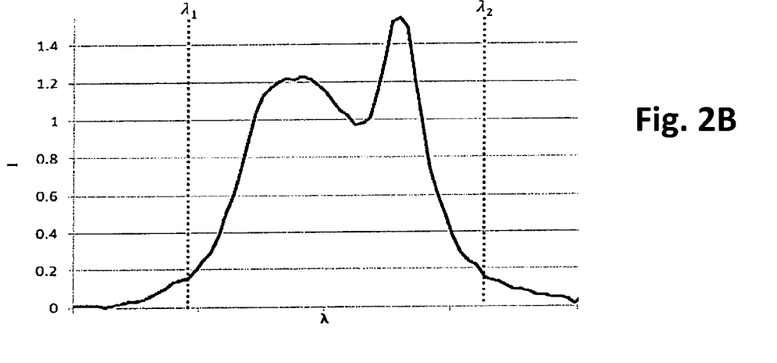

A measurement of the overall intensity with a resolution of at most 20 nm, that is, for example with a resolution of 20 nm, 30 nm or 50 nm, results in an uninterrupted "primary emission range" P, which is defined as follows (see FIG. 2, area between the dotted marking lines):

The maximum of the overall intensity is in the primary emission range.

The primary emission range is the greatest contiguous wavelength range in which the overall intensity does not fall below 10% of the maximum.

The background to this definition is that, for an efficient, quickly readable security feature, the main emission must necessarily be evaluated and not exclusively, for example, a possibly also present weaker secondary emission. Further, the determination of the decay time in less intensive ranges leads to a higher measurement inaccuracy and/or to an increased signal-to-noise ratio, so that no reliable value for the decay time can be ascertained for these sub-ranges in a fast measurement. However, with sufficient time and measuring effort, optionally also sub-ranges beyond the primary emission range, such as weakly intensive ranges and secondary bands, can be evaluated in addition.

The "degree of overlap" of two luminescence emissions of two mutually different luminescent substances in the primary emission range is defined as follows: First, the individual (spectral) intensities I'(x) and J'(x), whose curves will result when the individual intensities I' and J' are plotted against the wavelength (x), are normalized to the same surface area. This means $$I(x)=I'(x)/\int_{\lambda_1}^{\lambda_2} I'(x)dx, J(x)=J'(x)/\int_{\lambda_1}^{\lambda_2} J'(x)dx.$$

In this case, for example, a normalization was effected to the surface area 1. $\lambda_1$ is the lower limit wavelength of the primary emission range and $\lambda_2$ is the upper limit wavelength of the primary emission range.

The degree of overlap is then defined by the following formula:

$$\text{Degree of overlap} = \frac{2\int_{\lambda_1}^{\lambda_2} I(x) \cdot J(x)dx}{\int_{\lambda_1}^{\lambda_2} I(x) + \int_{\lambda_1}^{\lambda_2} J(x)dx}$$

It denotes the percentage proportion of overlapping area within the primary emission range when the spectra of the individual emissions of the respective luminescent substances are superimposed (hatched area in FIG. 2A).

The degree of overlap of the emission of two luminescent substances is a characteristic which is independent of the relative intensity and concentration of the luminescent substances and relates solely to the shape-dependent overlap of the respective emission spectra. To determine the degree of overlap, emission curves measured at room temperature are considered, which were measured with a detector resolution of more than 5 nm and less than 100 nm, preferably more than 10 nm and less than 50 nm, particularly preferably more than 15 and less than 30 nm.

According to the invention, the luminescent substances are formed such that the individual emission spectra of the luminescent substances have a degree of overlap of less than 80%, preferably less than 65%, particularly preferably less than 50%, as well as a degree of overlap of more than 5%, preferably more than 10%, particularly preferably more than 20%.

Further, the luminescent substances according to the invention are formed such that they have different individual decay times in the primary emission range, wherein the individual decay times of the luminescent substances, with reference to the shortest individual decay time of the luminescent substances, are more than 50%, preferably at least 75%, particularly preferably at least 100%, different from each other.

As already stated, in conventional security markings with multi-exponential decay curves, the spectral intensities must have a quasi-identity or at least large overlap, so that they act like the emission of a single luminescent substance. The invention here goes exactly the opposite way by using luminescent substances whose spectral intensities have a degree of overlap of less than 80%, but more than 5%. By combining at least two luminescent substances with partially overlapping emission spectra and significantly different time profiles (i.e. rise times and/or decay times), an overall intensity is produced in a certain spectral range (primary emission range) whose effective (i.e. measured) overall decay time varies continuously with the observation wavelength. This means that the overall decay time changes continuously with a change in wavelength.

In principle, combinations of two or more strongly or less strongly overlapping luminescent substances can be considered to imitate a particular emission band form of two luminescent substances. If, however, luminescent substances with significantly different decay time behavior are chosen for the combination, like in the present invention, then the detected measurement result changes depending on the degree of overlap of the two components in the respectively examined wavelength ranges.

Figure 1:
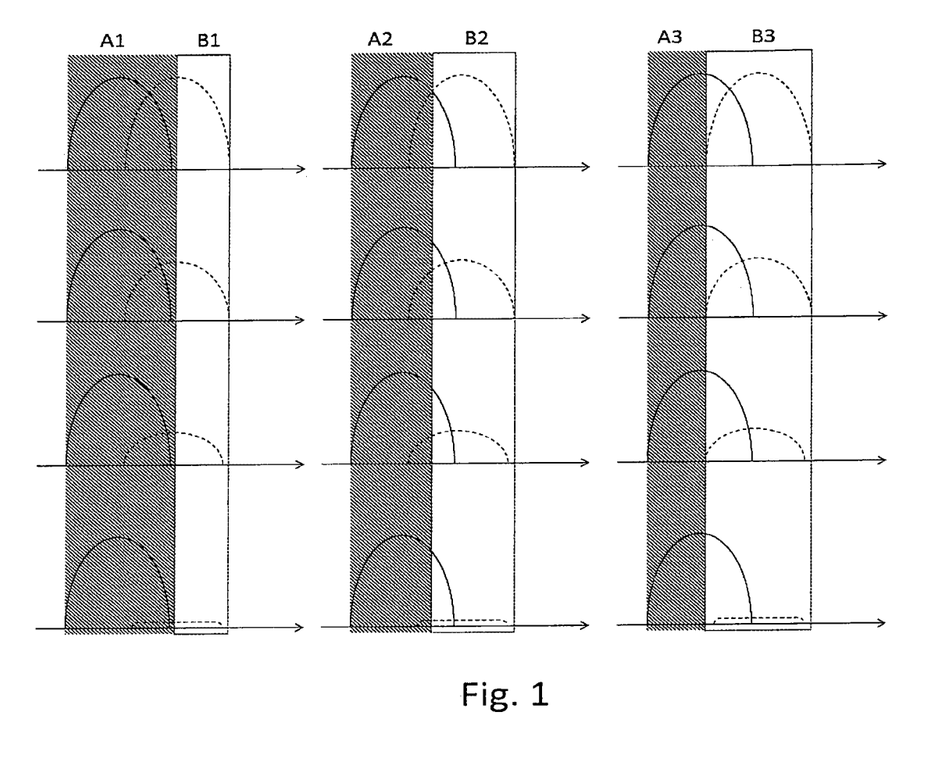
FIG. 1 diagrams for illustrating the time profile of the spectral intensities of a combination of luminescent substances with significantly different decay times for different detection channels.

This will be explained in more detail with reference to FIG. 1. FIG. 1 shows various diagrams, in each of which the emitted (individual) intensity of two substances in the primary emission range is plotted against the wavelength (spectral intensity). The schematic diagrams illustrate the time profile of the emission bands of two luminescent substances with significantly different decay times, wherein a first luminescent substance has a longer decay time (solid line) and a second luminescent substance has a shorter decay time (dashed line). To verify a security feature with luminescent substances with significantly different individual decay times, different spectral ranges (detection channels) can be evaluated. Here, the same primary emission spectrum for the three cases is separated into respectively two different detection channels A1/B1, A2/B2 and A3/B3, wherein the time profile of the spectral intensity results (from top to bottom) from the diagrams arranged above and/or below each other. It is evident that the spectral decay time of the emission band with longer intensity remains unchanged during the observation period, whereas the spectral decay time of the emission band with a shorter intensity decreases strongly over time.

The spectral ranges A1 and B1, A2 and B2 and A3 and B3 respectively jointly form the primary emission range (respectively identified in the diagrams by a hatched A-area and a bordered B-area). Accordingly, in the detection channels A1, A2, B2 and B3, respectively different portions of the emission bands of the first and the second luminescent substance are contained due to their different size. However, the detection channels B1 and A3 contain only emission portions of the faster or the more slowly decaying luminescent substance. Thus, the decay time measured in the detection channel B1 is relatively short. In contrast to this, the detection channel B2 also contains a small emission portion of the first luminescent substance with a longer decay time, so that the decay time measured in the detection channel B2 is longer than that in the detection channel B1. In corresponding manner, the detection channel B3 again shows a longer decay time due to the even larger emission portion of the first luminescent substance with a longer decay time. The opposite applies in each case to the detection channels A1, A2 and A3, wherein the detection channel A3 shows the longest decay time.

What is essential here is that at least one detection channel comprises at least one sub-range of the primary emission range. This detection channel can (alternatively) be formed as follows:
- as a sub-range of the primary emission range,
- as the primary emission range,
- as a wavelength range which contains a sub-range of the primary emission range and extends beyond the primary emission range,
- as a wavelength range that contains the primary emission range and extends beyond the primary emission range.

Preferably, at least one detection channel comprises at least a sub-range of the overlap range.

Within the meaning of the present invention, the term "detection channel" extends to both a wavelength interval, defined by mutually different wavelengths which state the interval limits, and only to a single wavelength. The detection channel can thus also be composed of only one single wavelength. This applies correspondingly to the term "sub-range".

Deviating from this simplified scheme, it is possible according to the invention to also work with more than two spectral ranges (detection channels), for example, 10 detection channels. Further, these detection channels are normally not sharply separated, as shown schematically here, but are formed by the spectral profile of the filter curve of the filter chosen in the detector.

Further, more complex forms of the overlap or of the spectral profile are possible. For example, not only can a luminescent substance, as represented schematically, be composed of a symmetrically constructed emission band, but can have an asymmetric band, a main band with a shoulder or several bands, such as e.g. a main band and several secondary bands, in the examined range. Further, the individual luminescent substances themselves can show peculiarities in their time behavior, for example a measurable rise behavior with associated rise time or an atypical profile of the decay curve. As a result, substantially more complex relationships between the observed spectral range and the detected decay time with local minima, local maxima or one or several inflection points are possible.

For an imitation of the profile of the overall decay time of such luminescent substances varying continuously with the wavelength, a specific combination of luminescent substances is necessary, since the individual components not only have to result in the target spectrum in sum, but must also have matching ranges of spectral overlap and matching decay time ratios. This considerably complicates imitation.

According to the invention, by combining at least two luminescent substances with a defined partial spectral overlap and with specific different decay times, effective protection against imitation can be achieved. An imitation by combining different luminescent substances with different spectral properties is only possible here if the exact measurement parameters, in particular the spectral position and shape of the filter curves of the detection channels, the time sampling or the time profile of the luminescence, as well as the algorithm or the chosen measurement parameters for determining the effective decay time value are known.

By an overlap of the spectral intensities of the luminescent substances of less than 80% and more than 5%, it is ensured according to the invention that there is sufficient variance in the decay time behavior of the overall intensity of the luminescent substances and, on the one hand, the presence of a single mixed decay time that is constant over the entire range (corresponding to a degree of overlap of 100%, i.e. identical spectral shape of both emissions) and, on the other hand, the presence of individual, separate emissions, each with constant decay times (corresponding to a degree of overlap of 0%) is avoided in an advantageous manner.

The emissions of the luminescent substances and thus the primary emission range are preferably in a narrow spectral range. In an advantageous embodiment of the value document according to the invention, the luminescent substances are formed for this purpose such that immediately or directly adjacent intensity maxima of mutually different emission spectra differ from each other by less than 200 nm, preferably by less than 100 nm. The immediately or directly adjacent intensity maxima of mutually different emission spectra are preferably spaced apart from each other by more than 20 nm, particularly preferably by more than 50 nm, in order to obtain an overlapping wavelength range that is sufficiently large for the security marking. In a particularly advantageous embodiment of the invention, the immediately or directly adjacent intensity maxima of mutually different luminescent substances each have a distance of less than 100 nm and more than 50 nm.

In a further advantageous embodiment of the value document according to the invention, the luminescent substances are formed such that the individual decay times of the luminescent substances are in the range of 50 µs to 5000 µs, preferably in the range of 100 µs to 1000 µs. Preferably, the individual decay time of a first luminescent substance is in the range of 100 µs to 200 µs and the individual decay time of a second luminescent substance is in the range of 400 µs to 1000 µs, whereby a particularly good protection against imitation of the security marking can be achieved.

In particular, substances with decay times of more than 5 milliseconds according to the invention cannot be used in machine evaluation with high-speed banknote sensors, since here the banknote is transported at speeds of up to 12 meters per second. A detection or separation of such long decay times cannot be carried out, since the banknote moves out of the measuring field before the luminescence intensity has dropped noticeably due to the decay time. Further, the measurement of very short decay times is technically complex. Preferably, none of the luminescent substances has a decay time of more than 5000 µs, particularly preferably of less than 2000 µs, most particularly preferably of less than 1000 µs. In one variant, none of the luminescent substances has a decay time of less than 50 µs, particularly preferably of less than 80 µs, most particularly preferably of less than 100 µs.

The luminescent substances are preferably formed such that the overlapping emissions (individual intensities) of the luminescent substances have a similar integrated individual intensity or even a substantially identical integrated individual intensity over at least one detection channel or over the primary emission range. If the integrated individual intensities of the luminescent substances deviate too much from each another, the behavior is predetermined largely by only one component, as a result of which there is possibly no sufficiently clear change in the decay time behavior over the spectral range to be verified.

In an advantageous embodiment of the value document according to the invention, the luminescent substances for this purpose are therefore present in such a mixing ratio that their integrated individual intensities over at least a sub-range of the primary emission range, in particular over the primary emission range, differ by less than 50%, preferably by less than 30%, particularly preferably by less than 15% with reference to the greatest integrated individual intensity of luminescent substances. Preferably, the luminescent substances are excited in the infrared range, i.e. in a wavelength range between 700 nm and 2000 nm. In an advantageous embodiment of the invention, the luminescent substances are excitable in the infrared range. In a particularly preferred embodiment of the invention, the luminescent substances are formed such that they can be excited together by a same wavelength, which in particular allows a targeted and relatively strong excitation of the luminescent substances by a comparatively narrow-band excitation pulse (flash of light). In this case, it is advantageous if the wavelength corresponds to a common absorption maximum in the excitation spectra of the luminescent substances or, in the case of mutually different absorption maxima, can excite at least 50% of the respective absorption maximum. The excitation is preferably effected in a strong excitation band of a rare earth ion that is contained in both luminescent substances. An efficient common excitation of the luminescent substances is made possible thereby. At the same time, this excitation band is simultaneously the absorption maximum of the respective excitation spectra or an absorption band which reaches at least 50% of the absorption maximum of the excitation spectrum. In a particularly preferred embodiment of the invention, the luminescent substances are mixed with each other in such a ratio that a simultaneous excitation of the individual luminescent substances is possible and the individual luminescent substances luminesce substantially equally strongly and are excitable efficiently. Preferably, two conditions are thus fulfilled:

The integrated individual intensity of each substance, when excited together, is at least 50% of the maximum integrated intensity that this substance achieves under optimal excitation.

The integrated individual intensities of the different substances, when excited together, differ by no more than 50% of the greatest integrated individual intensity.

Preferably, the emission of the luminescent substances takes place substantially in the primary emission range, particularly preferably exclusively in the primary emission range. In particular, the emission of the luminescent substances substantially takes place in a sub-range of the primary emission range, particularly preferably exclusively in a sub-range of the primary emission range. This means that apart from the partially overlapping emission bands, no further emission bands occur in other spectral ranges. In this manner, it is advantageously avoided that further non-overlapping emission bands occurring in isolation can be evaluated separately in the context of an imitation in order to draw conclusions about the emission bands of the primary emission range. In a preferred embodiment of the invention, the luminescent substances for this purpose are formed such that at least 80%, in particular at least 90%, of the emissions are emitted at least in a sub-range of the primary emission range.

Preferably, the primary emission range is in the infrared range, i.e. between 700 nm and 2000 nm, particularly preferably between 800 nm and 2000 nm. Preferably, the emission centers of the luminophors are rare earth ions, in particular the rare earth ions neodymium (Nd), ytterbium (Yb), erbium (Er), thulium (Tm), and/or holmium (Ho).

In a particularly preferred embodiment of the invention, the primary emission range is in the range of 750 nm to 1100 nm. In a further preferred embodiment of the invention, the primary emission range is in the range of 800 nm to 1100 nm. In a further preferred embodiment of the invention, the primary emission range is in the range of 900 nm to 1100 nm. Particularly preferably, both excitation and emission of the luminescent substances are in the range of 750 to 1100 nm and the emission centers of the luminophors are the rare earth ions neodymium (Nd) and/or ytterbium (Yb). Neodymium and ytterbium show different spectrally closely adjacent emissions in this wavelength range, which therefore are particularly likely to overlap. Other than neodymium and/or ytterbium, the luminophors preferably contain no further optically active rare earth cations which cause a luminescence emission.

The profile of the spectrally continuously varying overall decay time of the mixture of luminescent substances can take a large variety of forms. In a simple variant, the measured overall decay time is monotonically decreasing or increasing over the considered spectral range. However, depending on the spectral shape and the overlap range of the luminescent substances used, significantly more complex variants are also possible. Preferably, the profile of the measured overall decay time has pronounced structures, for example local minima, maxima or inflection points. Preferably, these structures are present within a wavelength range extended over at least 50 nm, preferably at least 100 nm. This allows a simple check of the varying measured (i.e.

effective) overall decay time within the spectral range under consideration and improves feature security since the individual spectral analysis is rendered more difficult. In a preferred embodiment of the invention, the luminescent substances for this purpose are formed such that a spectral profile of the overall decay time has at least one (global or local) minimum and/or at least one (global or local) maximum and/or at least one inflection point, in particular within a wavelength range of at least 50 nm, in particular of at least 100 nm. Preferably, the spectral profile of the overall decay time has at least two (global or local) minima and/or at least two (global or local) maxima.

A further increase in complexity is possible if luminescent substances with particular time behavior are employed, for example luminescent substances which additionally have a non-negligible rise time. In this case, the emission intensity increases slowly during the excitation of the luminescent substance and then drops again after the excitation has ended. In other cases, the emission intensity even continues to increase for a certain period of time after the excitation has ended, to finally decay again. In a preferred embodiment, at least one of the luminescent substances with overlapping emissions used has a pronounced rise behavior.

Preferably, the luminophors substantially (<5% rel. intensity) have no additional anti-Stokes emission.

The luminescent substances of the security marking of the value document according to the invention can basically be chosen freely as long as it is ensured that their emissions partially overlap, wherein the emission spectra have a degree of overlap of less than 80% and more than 5%, and wherein the luminescent substances have significantly different decay times.

Particularly preferred according to the invention are luminescent substances which each comprise a host lattice which is doped with at least one dopant chosen from the rare earth metals (or their ions).

Examples of suitable host lattices are oxides, garnets, perovskites, sulfides, oxysulfides, apatites, vanadates, tungstates, glasses, tantalates, niobates, halides, fluorides or aluminates, in particular inorganic host lattices, such as YAG, ZnS, YAM, YAP, AlPO-5 zeolite, $Zn_2SiO_4$, $YVO_4$, $CaSiO_3$, $KMgF_3$, $Y_2O_2S$, $La_2O_2S$, $Ba_2P_2O_7$, $Gd_2O_2S$, $NaYW_2O_8$, $SrMoO_4$, $MgF_2$, MgO, $CaF_2$, $Y_3Ga_5O_{12}$, $KY(WO_4)_2$, $SrAl_{12}O_{19}$, ZBLAN, $LiYF_4$, $YPO_4$, $GdBO_3$, $BaSi_2O_5$. According to the invention, preference is given to inorganic host lattices.

According to the invention, suitable dopants are, for example, the rare earths: Ce, Pr, Nd, Sm, Eu, Gd, Tb, Dy, Ho, Er, Tm, Yb, Lu, or. Bi, Pb, Ni, Sn, Sb, W, Tl, Ag, Cu, Zn, Ti, Mn, Cr and V (or their ions), wherein Nd and Yb are preferred.

In a particularly preferred embodiment of the invention, a first luminescent substance is an ytterbium-doped inorganic matrix and a second luminescent substance is an ytterbium-doped inorganic matrix.

In a further preferred embodiment of the invention, a first luminescent substance is an inorganic matrix doped with both neodymium and ytterbium, and a second luminescent substance is an inorganic matrix doped with both neodymium and ytterbium.

In a further preferred embodiment of the invention, a first luminescent substance is a neodymium-doped inorganic matrix and a second luminescent substance is a neodymium-doped inorganic matrix.

In a further preferred embodiment of the invention, a first luminescent substance is an inorganic matrix doped with both neodymium and ytterbium, and a second luminescent substance is a neodymium-doped inorganic matrix.

In a further preferred embodiment of the invention, a first luminescent substance is an inorganic matrix doped with both neodymium and ytterbium, and a second luminescent substance is an ytterbium-doped inorganic matrix.

Accordingly, it is preferred that the luminescent substances each comprise a host lattice doped with at least one rare earth metal, wherein in particular a first luminescent substance comprises an inorganic host lattice doped with ytterbium and/or neodymium and a second luminescent substance comprises an inorganic host lattice doped with ytterbium and/or neodymium.

Due to their markedly shifted emission wavelength in comparison to other inorganic matrices, at least one luminescent substance is preferably composed of a rare earth phosphate doped with neodymium and/or ytterbium. In a particularly preferred embodiment, a luminescent substance is a rare earth phosphate doped with neodymium and/or ytterbium, and a further luminescent substance is a rare-earth garnet structure doped with neodymium and/or ytterbium.

Rare earth oxysulfides can also be used, but are less suitable spectrally than rare earth phosphates. In a further preferred embodiment of the invention, at least one luminescent substance is preferably composed of a rare earth oxysulfide doped with neodymium and/or ytterbium. In a particularly preferred embodiment, a luminescent substance is a rare earth oxysulfide doped with neodymium and/or ytterbium, and a further luminescent substance is a rare-earth garnet structure doped with neodymium and/or ytterbium.

In a further preferred embodiment of the invention, one of the luminescent substances is a niobate, tantalate, vanadate or tungstate, which is doped with neodymium and/or ytterbium. Preferably, a further luminescent substance is a rare-earth garnet structure doped with neodymium and/or ytterbium. In a combination of these substance classes spectral shifts are observed which are particularly suitable for the combination of luminescent substances according to the invention.

In a further preferred embodiment of the invention, the different decay time is achieved by combining a luminescent substance having a low overall content of optically active rare earth cations of less than 3 percent by weight, preferably less than 2 percent by weight, with a luminescent substance having a high overall content of optically active rare earth cations of more than 5 percent by weight, preferably more than 8 percent by weight. What is meant here by "optically active rare earth cations" are the rare earth cations doped into the inorganic matrix as centers for excitation and emission of the luminescence, such as e.g. neodymium and ytterbium, in contrast to optically inert rare earth cations, which are involved in the construction of the matrix and do not act as luminescence centers, such as yttrium or lanthanum. Preferably, the optically active rare earth cations are neodymium and ytterbium.

Accordingly, it is preferred that the luminescent substances are formed such that an overall content of one or several optically active rare earth metals in a first luminescent substance amounts to less than 3 wt.-%, in particular less than 2 wt.-%, and an overall content of one or several optically active rare earth metals in a second luminescent substance amounts to more than 5 wt.-%, in particular more than 8 wt.-%.

The invention further extends to a method for identifying (i.e. detecting the presence or absence) of the security marking of a value document formed as described above. The method comprises the following steps of:

exciting the luminescent substances with at least one (for example common) excitation pulse, detecting the time profile of an overall intensity of the emitted radiations of the luminescent substances in one or several detection channels, wherein at least one definable detection channel comprises at least a sub-range of the primary emission range, determining an (effective) decay time in each detection channel, identifying the security marking on the basis of the determined one or several decay times.

In a particularly advantageous embodiment of the method according to the invention, the time profile of the overall intensity of the emitted radiations is in each case comprised in several, mutually different detection channels. The detection channels can each comprise a sub-range of the primary emission range. However, it is also possible that a part of the primary emission range and/or further emission ranges are completely outside all detection channels.

In an advantageous embodiment of the method according to the invention, at least two detection channels are wholly or partially within the primary emission range. For example, the primary emission range can be divided into two halves of equal size, wherein each half represents a detection channel. However, the detection channels do not need to be exactly within the primary emission range, but can also be smaller or larger and thus, for example extend beyond the primary emission range or be offset relative thereto. In particular, more than two detection channels, for example three detection channels or ten detection channels can be within the primary emission range.

In an advantageous embodiment of the method according to the invention, the individual detection channels each have a wavelength range of less than 400 nm, preferably less than 200 nm, particularly preferably less than 100 nm. According to a preferred embodiment, all detection channels are substantially the same size, i.e. they differ by less than 10% from each other in size. According to a further preferred embodiment, the detection channels have at least partially different sizes, for example one detection channel has a size of 100 nm and a further detection channel has a size of 150 nm. According to a preferred embodiment, the individual detection channels are contiguous in succession, for example a first detection channel measures the wavelength range between 900 nm and 1000 nm, a second detection channel measures the wavelength range between 1000 nm and 1100 nm, and a third detection channel measures the wavelength range between 1100 and 1200 nm. According to a further preferred embodiment, one or several detection channels have distances from each another in which there is no further detection channel. For example, a first detection channel measures the wavelength range between 900 nm and 1000 nm, a second detection channel measures the wavelength range between 1000 nm and 1100 nm, and a third detection channel measures the wavelength range between 1150 and 1250 nm.

In a preferred embodiment of the invention, to verify the decay time behavior, the effective decay time at different wavelengths or in different wavelength ranges (i.e. two or more detection channels) is verified. The decay of the emission can be adjusted for example by employing at least two interpolation points with a monoexponential fit of the form $I(t)=A \cdot e^{-t/\tau}$ (decay quotient). This is a very fast and simple measuring method, which can be applied due to the choice of luminescent substances or luminescent substance properties according to the invention. In contrast to combinations of luminescent substances of the state of the art, as known from the document U.S. Pat. No. 9,046,486 B2 for example, advantageously no complex detection methods are necessary to obtain increased security. Further, in comparison to luminescent substances on the basis of inorganic matrix-based phosphors according to the invention, organic dye molecules in particular have broader emission spectra and significantly shorter decay times, which are frequently in the nanosecond range. Further, they have significantly smaller Stoke shifts. These properties are disadvantageous for readout and decay time verification, respectively. The inventive method thus allows a relatively simple, fast and reliable detection of the security marking.

BRIEF DESCRIPTION OF THE DRAWINGS

The invention will now be described on the basis of embodiment examples, wherein reference is made to the attached figures. There are shown.

DETAILED DESCRIPTION OF THE IMAGES

FIG. 1, which illustrates the time profile of the spectral intensities within different detection channels in the case of a combination of luminescent substances with significantly different decay times, has already been described.

FIG. 2A schematically shows the emission spectra of two different luminescent substances. The emission spectra complement each other in a sub-range of their (spectral) expansion. This area is hatched.

FIG. 2B shows the resulting overall intensity. The primary emission range P is the area between the dotted lines. It extends on both sides of the maximum overall intensity up to the wavelength at which the overall intensity falls below 10% of the maximum value for the first time ($\lambda_1$ or $\lambda_2$).

Figure 2C:
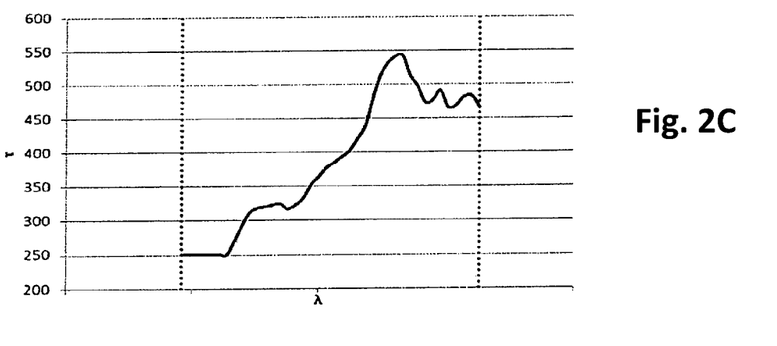

FIG. 2C shows schematically the effective decay time $\tau$ as a function of the wavelength in the primary emission range. It results in this example when the first luminescent substance (solid line) has a shorter decay time than the second luminescent substance (dashed line).

Figure 3:
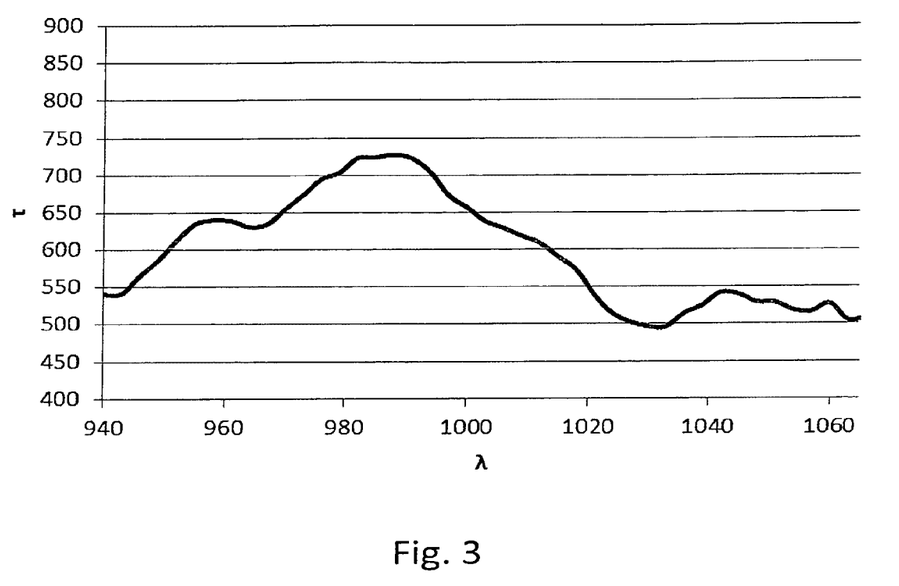
FIG. 3 a diagram representing the overall decay time of a combination of two Yb luminescent substances.

FIG. 3 shall be considered first, where there is shown, by way of example, a measurement of the overall spectral decay time of a combination of two Yb luminescent substances. In FIG. 3, the overall decay time (in microseconds, μs) is plotted against the emission wavelength (in nanometers, nm)

in the range of 940 nm to 1065 nm. The measured data points are interconnected by a solid data line. The first luminescent substance employed is an ytterbium-doped lanthanum phosphate, having an ytterbium content of 1.5 percent by weight and a decay time of 900 µs. The second luminescent substance employed is an ytterbium-doped yttrium-aluminum garnet, having an ytterbium content of 39 percent by weight and a decay time of 400 µs.

Upon excitation of the absorption bands of the ytterbium, both luminescent substances luminesce in the range between 940 and 1065 nm, wherein the respective emissions partially overlap (degree of overlap 37%). The wavelength range stated in FIG. 2 comprises the primary emission range of the luminescent substances used. The luminescent substances were mixed with each other in such a quantitative ratio that they luminesce with the same intensity upon simultaneous excitation.

When the overall decay time of the emissions at specific wavelengths of the emissions is determined, the values of FIG. 3 are obtained. For a measurement of the overall decay time of the emissions, the two luminescent substances are excited together in the absorption band of the ytterbium by a same excitation pulse (flash of light). The excitation pulse is turned on at a particular point in time and subsequently turned off. The time profiles of the intensities of the two luminescent substances each have a rise phase in which the intensity increases from zero to a maximum value, and a decay phase in which the intensity drops starting from the maximum value. The measurements of the overall intensity take place at defined points in time, wherein the measurements can take place at equidistant points in time, but also non-equidistant points in time. From the time profile of the overall intensity, the overall decay time of the emissions at specific wavelengths can be determined.

For this purpose, the intensity values $I_{100}$ after 100 µs and $I_{400}$ after 400 µs are measured within the scope of the examples, and the effective decay time $\tau$ is ascertained as follows:

$$\tau = -300 \text{ µs}/\ln(I_{400}/I_{100})$$

For example, if the intensity values at two other times are taken as the basis or a different algorithm is applied, respectively different overall decay time curves will result. In order to imitate the measurement data or check criteria of such features according to the invention, it is therefore required to know the measurement parameters exactly, whereby the protective effect is significantly increased.

The overall spectral decay time has a local maximum, a local minimum and an inflection point.

When the overall decay time of the emissions is measured in a first wavelength range of 960 nm to 1000 nm (corresponding to a first detection channel) and in a second wavelength range of 1000 nm to 1040 nm (corresponding to a second detection channel), then for the first detection channel an average value of the overall decay time of approximately 700 µs is obtained, and for the second detection channel an average value of the overall decay time of approximately 550 µs is obtained. On the basis of the two overall decay times the combination of luminescent substances can be identified reliably and securely.

FIGS. 4 to 7 show exemplary measurements of the overall spectral decay time of combinations of two different luminescent substances. In order to avoid unnecessary repetitions, only the differences to FIG. 3 are explained in each case, and otherwise reference is made to the explanations there.

Figure 4:
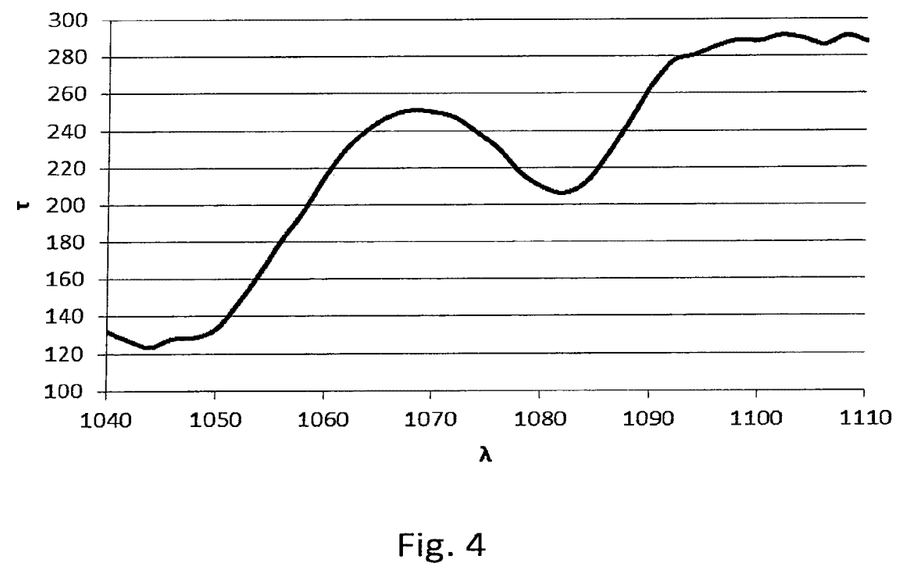
FIG. 4 a diagram representing the overall decay time of a combination of two Nd luminescent substances.

FIG. 4 shows the overall spectral decay time of a combination of two Nd luminescent substances. The first luminescent substance employed is a neodymium-doped lanthanum phosphate, having a neodymium content of 4.7 percent by weight and a decay time of 100 µs. The second luminescent substance employed is a neodymium-doped lutetium tantalate, having a neodymium content of 1 percent by weight and a decay time of 300 µs. When the absorption bands of the neodymium are excited, both luminescent substances luminesce in the range of 1040 nm to 1110 nm, wherein the respective emissions partially overlap (degree of overlap 43%). The wavelength range stated in the diagram of FIG. 4 contains the primary emission range of the luminescent substances used. The overall spectral decay time has a local maximum, a local minimum and an inflection point.

When the overall decay time of the emissions is measured in a first wavelength range of 1040 nm to 1075 nm (corresponding to a first detection channel) and in a second wavelength range of 1075 nm to 1110 nm (corresponding to a second detection channel), then for the first detection channel an average value of the overall decay time of approximately 190 µs is obtained, and for the second detection channel an average value of the overall decay time of approximately 260 µs is obtained. Alternatively, when the overall decay time is measured in several smaller ranges (1040 nm-1050 nm; 1050 nm-1060 nm; 1060 nm-1070 nm; 1070 nm-1080 nm; 1080 nm-1090 nm; 1090 nm-1100 nm; 1100 nm-1110 nm), this results in respective overall decay times on average of approximately 129 µs, 181 µs, 244 µs, 229 µs, 231 µs, 284 µs and 289 µs.

Figure 5:
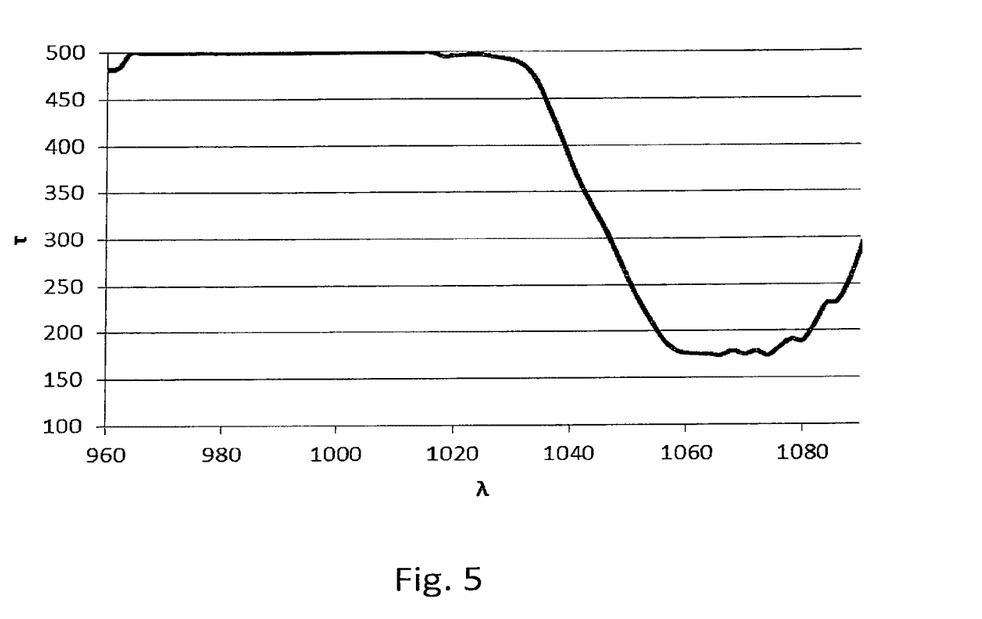
FIG. 5 a diagram representing the overall decay time of a combination of a Nd luminescent substance and a Nd/Yb luminescent substance.

FIG. 5 shows the overall spectral decay time of a combination of a Nd luminescent substance and a Nd/Yb luminescent substance. The first luminescent substance employed is a neodymium-doped lanthanum phosphate, having a neodymium content of 4.7 percent by weight and a decay time of 100 µs. The second luminescent substance employed is am yttrium-aluminum garnet doped with equal proportions of neodymium and ytterbium, having a dopant content of 19.5 percent by weight and a decay time of 500 µs. The first and second luminescent substances are used in a relative intensity ratio of 5 to 6. Upon excitation of the absorption bands of the neodymium, both luminescent substances luminesce in the range of 960 nm to 1090 nm, wherein the respective emissions partially overlap (degree of overlap 12%). The wavelength range stated in the diagram of FIG. 5 contains the primary emission range of the luminescent substances used. The overall spectral decay time is constant over a wide range, then decreases monotonically and subsequently increases again.

When the overall decay time of the emissions is measured in a first wavelength range of 970 nm to 1010 nm (corresponding to a first detection channel), in a second wavelength range of 1010 nm to 1050 nm (corresponding to a second detection channel), and a third wavelength range of 1050 nm to 1090 nm (corresponding to a third detection channel), then for the first detection channel an average value of the overall decay time of approximately 500 µs is obtained, for the second detection channel an average value of the overall decay time of approximately 400 µs is obtained, and for the third detection channel an average value of approximately 200 µs is obtained.

Figure 6:
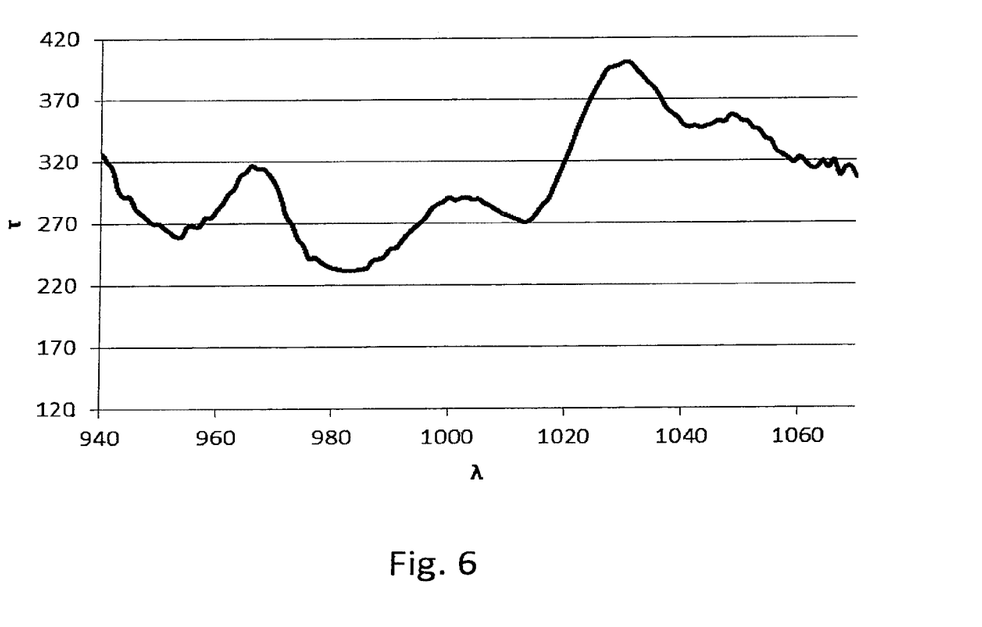
FIG. 6 a diagram representing the overall decay time of a combination of a Nd/Yb luminescent substance and a Nd/Yb luminescent substance.

FIG. 6 shows the overall spectral decay time of a combination of a Nd/Yb luminescent substance and a Nd/Yb luminescent substance. The first luminescent substance employed is yttrium oxysulfide doped with neodymium and ytterbium in the ratio 1:4, having a dopant content of 30 percent by weight and a decay time of 120 µs. The second luminescent substance employed is an yttrium-aluminum garnet doped with equal proportions of neodymium and ytterbium, having a dopant content of 19.5 percent by weight and a decay time of 500 µs. Upon excitation of the absorption bands of the neodymium, both luminescent substances luminesce in the range of 940 nm to 1070 nm, wherein the respective emissions partially overlap (degree of overlap 33%). The wavelength range stated in the diagram of FIG. 6 contains the primary emission range of the luminescent substances used. The overall spectral decay time has several local maxima and several local minima.

When the overall decay time of the emissions is measured in a first wavelength range of 940 nm to 1005 nm (corresponding to a first detection channel) and in a second wavelength range of 1005 nm to 1070 nm (corresponding to a second detection channel), then for the first detection channel an average value of the overall decay time of approximately 270 µs is obtained, and for the second detection channel an average value of the overall decay time of approximately 330 µs is obtained.

Figure 7:
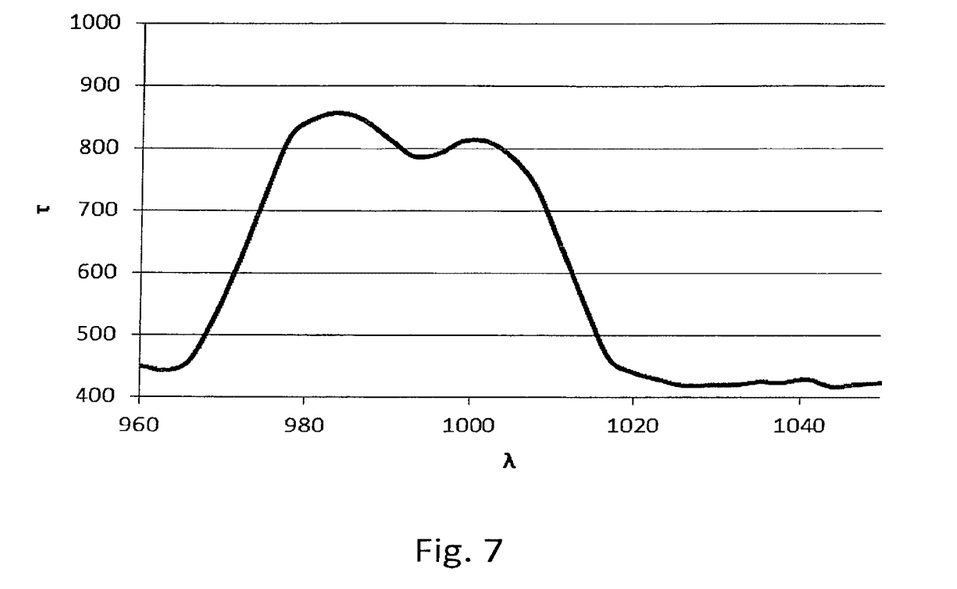
FIG. 7 is a diagram show in the overall spectral decay time of a combination of an Er luminescent substance and an Yb luminescent substance.

FIG. 7 shows the overall spectral decay time of a combination of an Er luminescent substance and an Yb luminescent substance. The first luminescent substance employed is an erbium-doped lanthanum oxysulfide, having a dopant content of 2 percent by weight and a decay time of 1000 µs. The second luminescent substance employed is an ytterbium-doped yttrium-aluminum garnet, having a dopant content of 39 percent by weight and a decay time of 400 µs. Upon simultaneous excitation of the overlapping absorption bands of the ytterbium and the erbium, both luminescent substances luminesce in the range of 960 nm to 1050 nm, wherein the respective emissions partially overlap (degree of overlap 34%). The wavelength range stated in the diagram of FIG. 7 contains the primary emission range of the luminescent substances used. The overall spectral decay time has several local maxima and several local minima.

When the overall decay time of the emissions is measured in a first wavelength range of 960 nm to 1005 nm (corresponding to a first detection channel) and in a second wavelength range of 1005 nm to 1050 nm (corresponding to a second detection channel), then for the first detection channel an average value of the overall decay time of approximately 710 µs is obtained, and for the second detection channel an average value of the overall decay time of approximately 470 µs is obtained.

The combinations of the luminescent substances of FIGS. 3 to 7 can each be used as security marking for a value document according to the invention.

As can be seen from the above description, the invention offers great advantages over the security markings and evaluation methods known in the state of the art, in which the luminescent substances used in combination have an identical emission wavelength or at least only slightly different emission wavelengths. In particular, with the luminescent substances used in combination according to the invention, a very high protection against imitation can be achieved. In addition, these allow a relatively simple, fast and reliable identification of the security feature. Thus, the security feature used according to the invention can be used in particular also in time-critical application cases, in which a fast evaluation method is essential, for example for analysis on banknote processing machines running at high speed.

The invention claimed is:

1. A value document having a security marking comprising at least two inorganic luminescent substances whose emission spectra partially overlap in a primary emission range,
wherein the emission spectra have a degree of overlap of less than 80% and more than 5%,
wherein the at least two inorganic luminescent substances have different individual decay times in the primary emission range,
wherein the different individual decay times of the at least two inorganic luminescent substances differ by more than 50% of a shortest individual decay time of the different individual decay times.

2. The value document according to claim 1, wherein the emission spectra of the at least two inorganic luminescent substances have a degree of overlap of less than 65%.

3. The value document according to claim 1, wherein directly adjacent intensity maxima of two different luminescent substances of the at least two inorganic luminescent substances differ from each other by less than 200 nm, and are spaced apart by more than 20 nm.

4. The value document according to claim 1, wherein the different individual decay times of the at least two inorganic luminescent substances differ by more than 75% of the shortest individual decay time.

5. The value document according to claim 1, wherein the different individual decay times of the at least two inorganic luminescent substances are in a range of 50 µs to 5000 µs, and
wherein an individual decay time of a first luminescent substance from the at least two inorganic luminescent substances is in the range of 100 µs to 200 µs and an individual decay time of a second luminescent substance from the at least two inorganic luminescent substances is in the range of 400 µs to 1000 µs.

6. The value document according to claim 1, wherein a spectral profile of an overall decay time in the primary emission range for a combination of the at least two inorganic luminescent substances has at least one minimum and/or at least one maximum and/or at least one inflection point within a wavelength range of at least 50 nm.

7. The value document according to claim 1, wherein the at least two inorganic luminescent substances are present in such a mixing ratio that individual intensities of the at least two inorganic luminescent substances integrated over the primary emission range differ from each other by less than 50% of a greatest integrated individual intensity of the individual intensities of the at least two inorganic luminescent substances.

8. The value document according to claim 1, wherein the luminescent substances are formed such that at least 90% of an overall emission of the at least two inorganic luminescent substances is emitted at least in a sub-range of the primary emission range.

9. The value document according to claim 1, wherein the at least two inorganic luminescent substances can be excited in the primary emission range.

10. The value document according to claim 1, wherein the at least two inorganic luminescent substances can be excited at a same wavelength,
wherein an integrated individual intensity of each of the at least two inorganic luminescent substances amounts to at least 50% of a maximum integrated individual intensity of the at least two inorganic luminescent substances at optimum excitation.

11. The value document according to claim 1, wherein the at least two inorganic luminescent substances each comprise a host lattice doped with at least one rare earth metal.

12. The value document according to claim 11, wherein a first luminescent substance of the at least two inorganic luminescent substances comprises an inorganic host lattice doped with ytterbium and/or neodymium and a second luminescent substance of the at least two inorganic luminescent substances comprises an inorganic host lattice doped with ytterbium and/or neodymium.

13. The value document according to claim 11, wherein an overall content of one or more rare earth metals in a first luminescent substance of the at least two inorganic luminescent substances amounts to less than 3 wt %, and an overall content of one or more rare earth metals in a second luminescent substance of the at least two inorganic luminescent substances amounts to more than 5 wt %.

14. The value document according to claim 11, wherein at least one luminescent substance of the at least two inorganic luminescent substances comprises a rare-earth-doped rare earth phosphate.

15. The value document according to claim 11, wherein at least one luminescent substance of the at least two inorganic luminescent substances comprises a rare earth phosphate doped with ytterbium and/or neodymium,
wherein a first luminescent substance of the at least two inorganic luminescent substances contains a rare earth phosphate doped with ytterbium and/or neodymium and a second luminescent substance of the at least two inorganic luminescent substances contains a rare-earth garnet structure doped with ytterbium and/or neodymium.

16. The value document according to claim 11, wherein a luminescent substance of the at least two inorganic luminescent substances comprises a rare-earth-doped niobate, tantalate, vanadate or tungstate.

17. The value document according to claim 11, wherein a luminescent substance of the at least two inorganic luminescent substances comprises a niobate, tantalate, vanadate or tungstate doped with ytterbium and/or neodymium,
wherein a first luminescent substance of the at least two inorganic luminescent substances comprises a niobate, tantalate, vanadate or tungstate doped with ytterbium and/or neodymium and a second luminescent substance of the at least two inorganic luminescent substances comprises a rare-earth garnet structure doped with ytterbium and/or neodymium.

18. A method for identifying the security marking of the value document according to claim 1, comprising:
exciting the at least two inorganic luminescent substances through at least one excitation pulse,
detecting an overall intensity of emitted radiation of the at least two inorganic luminescent substances in at least one detection channel comprising at least a sub-range of the primary emission range,
determining a decay time in the at least one detection channel, and
identifying the security marking from the determined decay time.

19. The method according to claim 18, wherein a sum of the at least one detection channel comprises a range of at most ±200 nm from a wavelength at which the overall intensity of the emitted radiation of the at least two inorganic luminescent substances has a focal point in the primary emission range.

20. The method according to claim 19, wherein for the at least one detection channel a luminescence intensity is determined at at least two points in time, and a decay time is determined from these at least two luminescence intensities determined at said at least two points in time.

21. A security feature for manufacturing a value document according to claim 1, comprising at least two inorganic luminescent substances whose emission spectra partially overlap in a primary emission range,
wherein the emission spectra have a degree of overlap of less than 80% and more than 5%,
wherein the at least two inorganic luminescent substances have different individual decay times in the primary emission range,
wherein the different individual decay times of the at least two inorganic luminescent substances differ from each other by more than 50% with reference to a shortest individual decay time of the different individual decay times.

* * * * *